No. 819,424. PATENTED MAY 1, 1906.
W. GRIESSER.
GRAIN DRIER.
APPLICATION FILED SEPT. 21, 1905.
5 SHEETS—SHEET 1.
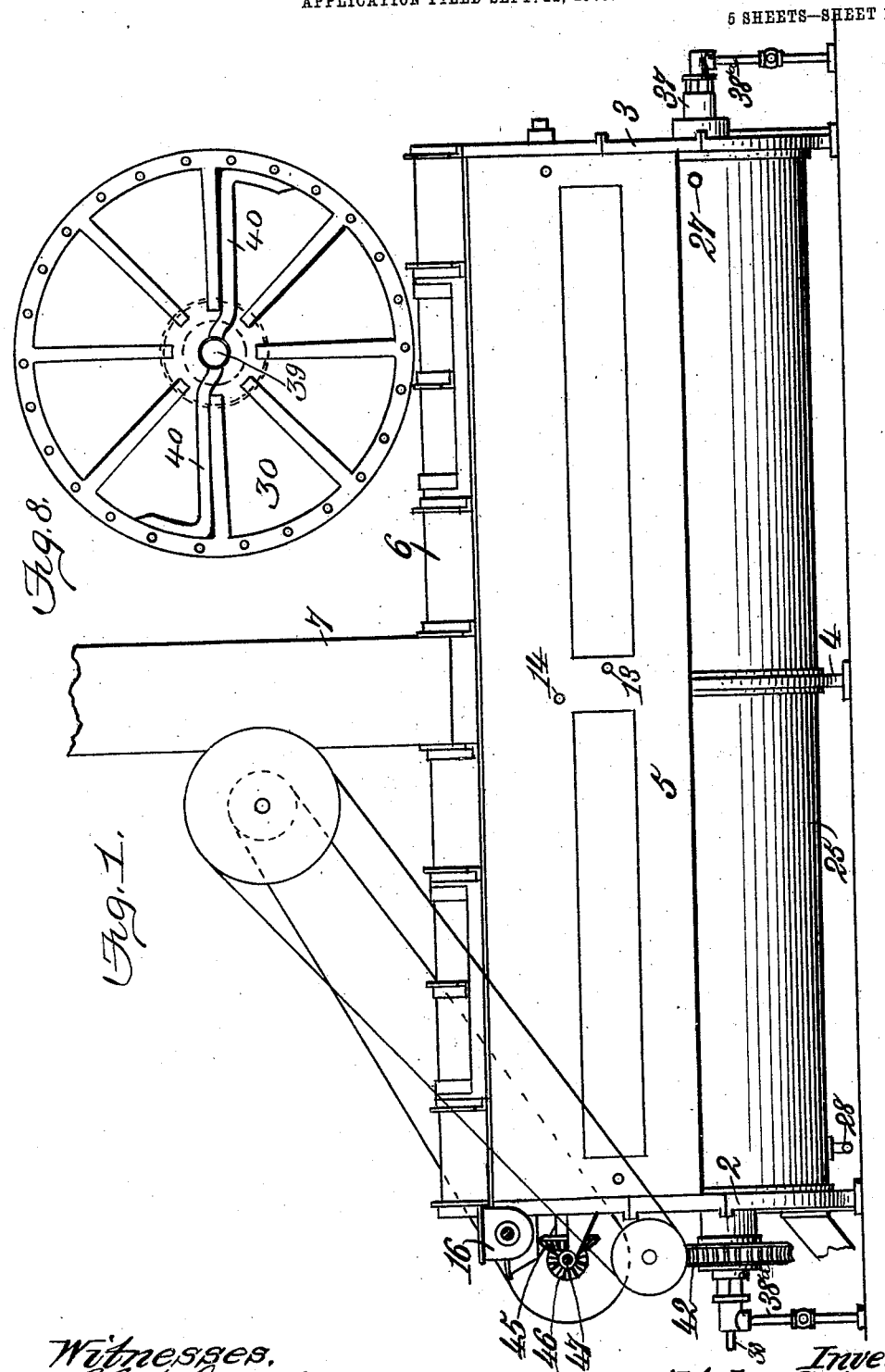

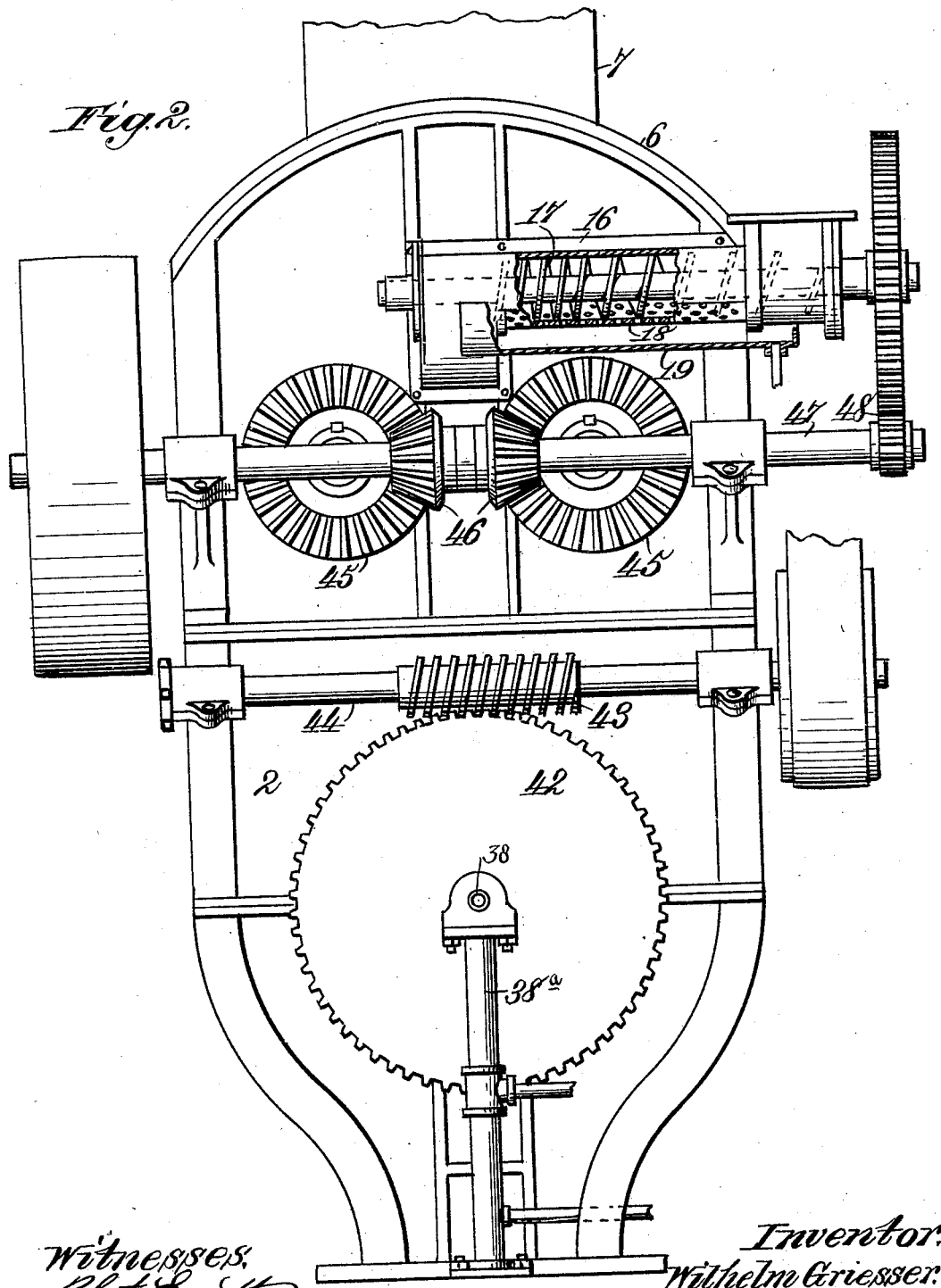

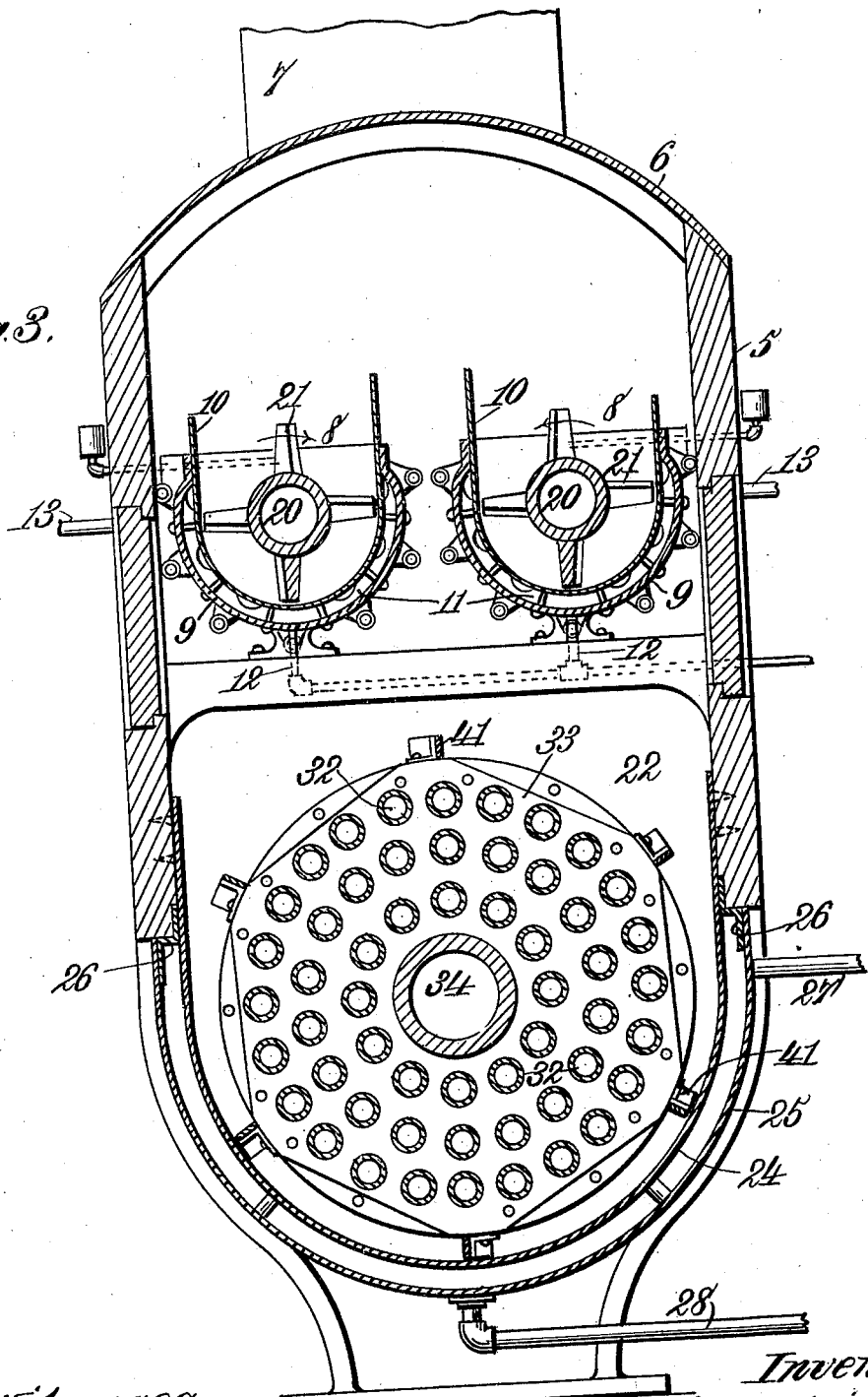

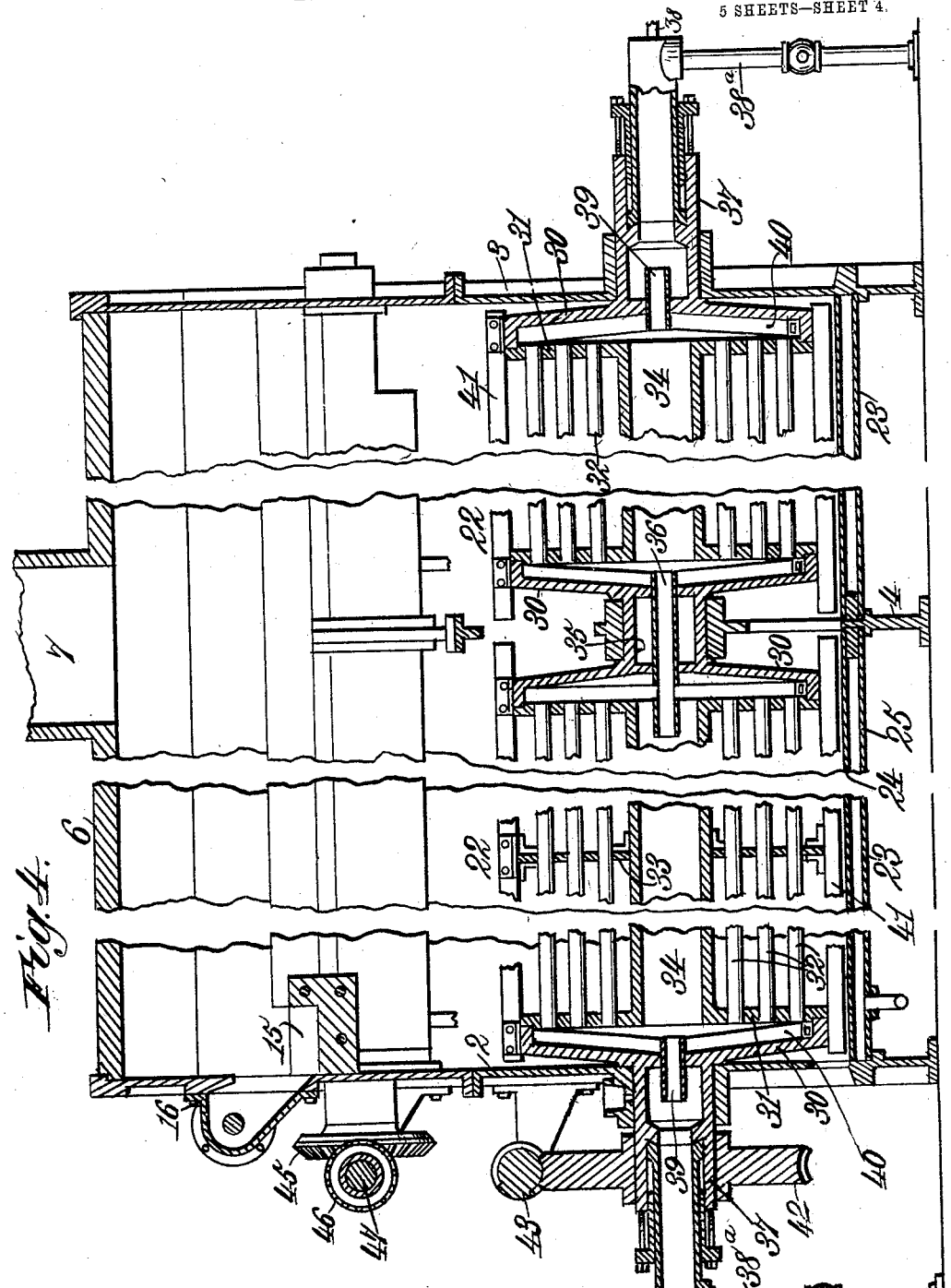

No. 819,424. PATENTED MAY 1, 1906.
W. GRIESSER.
GRAIN DRIER.
APPLICATION FILED SEPT. 21, 1905.
5 SHEETS—SHEET 5.
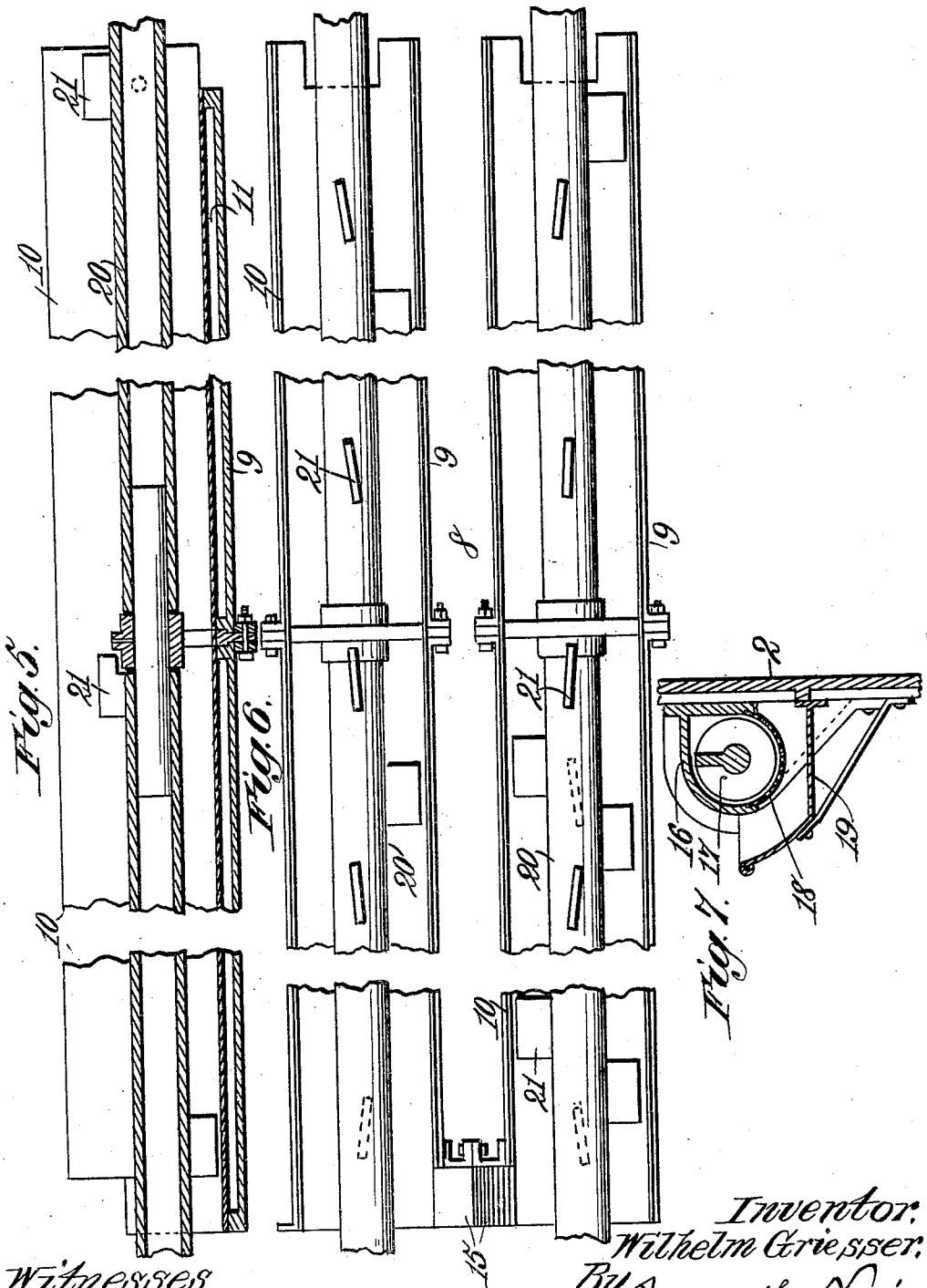
Witnesses.
Inventor:
Wilhelm Griesser.
By James L. Norris
Atty.

UNITED STATES PATENT OFFICE.

WILHELM GRIESSER, OF JOPLIN, MISSOURI, ASSIGNOR TO OLGA KOEHN, OF NEW YORK, N. Y.

GRAIN-DRIER.

No. 819,424.

Specification of Letters Patent.

Patented May 1, 1906.

Application filed September 21, 1905. Serial No. 279,473.

*To all whom it may concern:*

Be it known that I, WILHELM GRIESSER, a citizen of the United States, residing at Joplin, in the county of Jasper and State of Missouri, have invented new and useful Improvements in Grain-Driers, of which the following is a specification.

This invention relates to what I shall for convenience term a "grain-drier," as it is of particular utility for effectively drying grains of various kinds. It may be utilized, however, with equal advantage for drying other substances.

An apparatus involving my invention will thoroughly, uniformly, and rapidly dry substances of various kinds without injuring them. For example, in the case of grain the latter can be dried without burning or destroying any of the nutritive properties of the cereal.

The apparatus involves in its construction at least one trough and at least one combined heating and feeding drum. I prefer, however, to employ several drums and several troughs, the grain being initially received in the troughs and afterward passing from them under the action of the drums. The troughs and drums will preferably be of sections, so that they can be lengthened or shortened. I do not restrict myself, however, to these particular features, as will be gathered from what has been originally stated.

In the drawings accompanying and forming a part of this specification I illustrate a form of embodiment of the invention, which to enable those skilled in the art to practice said invention I will set forth in detail in the following description, while what I claim as new will be included in the claims succeeding said description.

In the drawings, Figure 1 is a side elevation of a drier including my invention. Fig. 2 is an end elevation, partly in section. Fig. 3 is a cross-sectional elevation, and Fig. 4 a longitudinal sectional elevation, of said drier. Fig. 5 is a longitudinal sectional elevation of a trough hereinafter described. Fig. 6 is a top plan view of two troughs, one of which is represented in the preceding figure. Fig. 7 is a sectional detail of a feed-conveyer and certain coöperative parts. Fig. 8 is an inside face view of one of the plates 30 and the tubes 40, carried thereby.

Like characters refer to like parts throughout all the figures of the drawings.

The framework for carrying the different parts of the apparatus may be of any suitable character. The framework represented in the drawings includes two end members, (designated by 2 and 3.) I give them distinctive characters, although they are of substantially similar construction. The only practical difference between the two end members is that the end member 2 is of such character as to provide for the introduction of the moist grain into the apparatus and the removal of dry grain therefrom, as will hereinafter more particularly appear. Each end member consists of several superimposed castings vertically disposed, and the under one of which is bolted or otherwise firmly fastened to a foundation, which may be and preferably is of concrete or some equivalent material in order to maintain the apparatus in stable condition.

Where I provide several combined feeding and heating drums and I show such construction in the drawings, I prefer to employ an intermediate frame member 4, like the others of skeleton construction and inexpensively made by casting. This intermediate frame member 4 serves as a central support for the troughs and drums mentioned.

The framework is cased or housed in, the casing or housing being denoted in a general way by 5 and being principally made from wood and in practice insulated or otherwise arranged to retain within it the heating medium, which in the present instance is steam. The casing or housing 5 will have doors, as 5ª, in its side to provide access to the interior thereof, and a roof or top, as 6, which is shown as arched. I do not deem it necessary to go into a detailed description of the casing, its doors, and roof, for the structure of these is not material. The roof or top of the casing, which also has one or more doors, as 6ª, has in addition thereto an opening, shown as substantially centrally of the roof and around which is an upwardly-extending flue, as 7, to carry off to the atmosphere vapors from the grain within the casing being dried.

Within the casing or housing 5 I illustrate two troughs, as 8, arranged in parallelism, slightly laterally separated, and extending from one end to the other of the casing. The ends of these two troughs are fastened in some suitable way, as by bolts, to the end members 2 of the framework. Each consists of a plurality of complemental sections, as 9, which may be bolted together to make a continuous structure, and plates, as 10, supported by such sections 9. The latter are of substantially cradle form, and being of similar construction it is apparent that it will be but a simple matter to increase the length of the troughs and necessarily the length of the apparatus. The sections 9, which may be readily made from casting, are of substantially U form in cross-section or of cradle form, as stated, and receive the plates 10, which are approximately U shape in cross-section and which really constitute the effective portions of the troughs, for it is into these plates that the material to be dried is directly received. Said U-shaped plates will be attached in some suitable way to the cradle-form castings or sections 9—for example, by riveting, the rivets being of such character that there will be no protrusions on the operative surfaces of the plates or those upon which the substance to be dried is supported. Such operative faces are concentric with the axes of motion of stirring devices hereinafter described, the blades of which traverse or substantially traverse said concentric surfaces to prevent the sticking of grain or other material thereto.

Where an intermediate frame member 4 is present, it serves to uphold the two troughs centrally thereof, the intermediate sections 9 of the troughs having bases or feet bolted to said intermediate frame member, whereby strength is assured. Between the plates 10 and sections 9 is a space 11 for drip-water, from which one or more drip-pipes, as 12, can lead to a point outside the casing, where such drip-water may be disposed of as desired.

Steam-pipes, as 13, lead into the casing toward the troughs for heating the material while in said troughs, while exhaust-steam pipes, as 14, lead out of the casing for carrying off the exhaust.

Between the head ends of the troughs is a deflector, as 15, shown as being of wedge form or substantially inverted-V shape. This deflector consists of two substantially similar sections bolted or otherwise fastened together below the apex of the deflector and shown as being integral with the head-sections 9 of the two parallel troughs. The material supplied within the casing is delivered first onto this deflector, which deflects the stream of material in equal volumes or divides it, one portion falling into one trough and the other into the other trough.

Bolted or otherwise fastened to the end member 2 is a casing 16 of a conveyer 17, shown as being of the screw type, said casing having its delivery end registering with an opening in the casing 5. The conveyer-casing has its inlet hopper-shaped. In this hopper-shaped portion of the casing 16 the material to be dried is initially delivered and is advanced forward by the conveyer along its casing 16 and into the receiving-opening in the casing 5, where it can fall onto the beveled head of the deflector 15, to be divided into equal portions thereby, as previously stated. The bottom of the conveyer-casing 16 consists of a foraminous plate 18, constituting a strainer and through the perforations or holes in which the water drained off from the material in said casing can pass, such water falling into the drip-pan 19 below the conveyer-casing and fastened—say by bolts—to the frame member 2. The drip-pan 19 may have a discharge-pipe for carrying off the drip-water therefrom, which latter may be disposed of in any suitable way. The flights of the feed-conveyer 17 are separated a greater distance at the receiving portion than at the delivery portion of said conveyer to permit the water to pass from the material as soon as it enters the casing without the actual necessity of pressing the grain, as in such case the nutriment of the latter would be affected.

In connection with each trough 8 I provide a stirrer consisting in the present case of an elongated shaft 20 (shown as hollow) and blades, as 21, extending from the said shaft. The two shafts are coextensive with their respective troughs, and the journal portions thereof are rotatively sustained by suitable boxes on the end members 2 and 3 of the framing, said shafts being supported by intermediate bearings when the troughs are very long. Means of a positive character will be provided to rotate the shafts, and I will hereinafter describe the means illustrated for such purpose. The blades or shovels 21, which extend from the shafts 20, are set angularly or diagonally to the longitudinal axes of the shafts, by reason of which when the latter are rotated the blades will act to forcibly advance the stock lengthwise along the heated trough, agitating or stirring the mass while feeding it. The loosening up of the mass and its subjection to heat initially dry it, the final drying being subsequently accomplished by different means and in an effective way, so that when the grain or other article leaves the apparatus it will be completely dry.

At their delivery ends the troughs 8 have side outlets for the passage of grain, the latter falling onto combined feeding and heating means consisting in the present case of two drums, each denoted in a general way by 22 and arranged end to end. These drums 22 work in troughs, as 23, extending the complete length of the casing 5 interiorly thereof, said troughs consisting of substantially U-shaped plates, as 24 and 25, fastened, as by bolts, at their opposite ends to U-shaped ribs or flanges upon the end members 2 and 3 of the framework. The plate 24 is inclosed by the plate 25, the sides of the former, however, extending above the upper edges of the outer plate 25 and being fastened, as by screws, to the casing 5. The plates 24 and 25 are separated to provide a steam space or chamber, the top of such space or chamber being closed by Z-beams, as 26, to the ascending and descending flanges of which the two plates are fastened in some steam-tight manner. The ends of the Z-beams 26 are connected with the frame members 2 and 3. For strength the two plates 24 and 25 are connected by tie-bolts. Leading into the space between said plates is a supply-pipe, as 27, for live steam, the exhaust being carried off from such space by a pipe, as 28, tapped through the bottom of the outer plate, the supply-pipe 27 being tapped through the said outer plate near its upper edge. Several of these supply and exhaust pipes 27 and 28 may be provided, this being governed by the length of the apparatus, which can be regulated to suit individuals.

I will describe in detail the construction of one of the drums, and such description will be applicable to the other, as they are of duplicate construction. The drum includes two heads, each designated by 30, of concavo-convex form, with the convex side of each outward. To these heads are fastened in some steam-tight manner, as by properly-packed bolts, sheets 31, in perforations of which are expanded the opposite ends of tubes 32. If the drum is made long, I will provide one or more intermediate sheets, as 33, through perforations in which the steam-tubes 32 will extend. It will be understood that the opposite ends of the tubes 32 open into steam-spaces located at the opposite ends of the two drums and formed by the end sheets 31 and the heads 30. The tubes 32 are arranged in concentric series and around a central tube, as 34, of larger diameter, extending from one head 30 to the other. The adjacent heads of the two drums are shown as connected by a hollow neck, as 35, rotatively supported by a bearing forming part of the intermediate frame guide member. Through this neck and extending oppositely therefrom is a pipe, as 36, for conveying the steam from one drum to the other. It will be understood that the hollow neck 35 in addition to forming a connection between the two drums serves also as an intermediate journal therefor.

Extending outward from the outer heads of the two drums are hollow journals or shafts, each denoted by 37, supported by bearings upon the frame members 2 and 3 and into which steam from pipes, as 38, may be introduced, such steam passing from the hollow journals or shafts through tubes, as 39, fitted closely in central perforations in the outer heads 30, said tubes serving as means to convey the live steam into the steam spaces or chambers at the opposite ends of the drum, from which such steam can pass through the tubes 32 and 34 to heat the said tubes, and thereby the grain, to dry it, passing through the spaces between the tubes. It is evident from what has just been stated that the drums are of skeleton formation for the passage of the grain therethrough. The steam-pipes 38 enter the journals or shafts 37 by way of stuffing-boxes, which need not be described in detail, and in connection with said steam-pipes I will in practice provide traps for disposing of the water of condensation, and as they are of the ordinary form I need not show or describe them. It will be understood that the steam-pipes 38 supply live steam to the interior of the feeding and heating drum, which I have specifically described and which is composed in part of the heads 30, plates 31, and connecting-tubes 32 between said plates.

Extending outward from the central openings of all four of the heads 30 are tubes 40, bent at their outer ends to present lateral portions, which are open. The tubes 40 constitute scoops, and as their outer ends are open the condensed water rolling down the inner concaved surfaces of the heads can enter said openings, so that subsequently such water can run toward the center of the heads by way of the scoop-pipes and into the tubes 36 and 39. The tube 36 delivers the condensed water into the tubes 34. From the outer heads 30 the condensed water is conveyed to the tubes 39 by the scoops or gathering-tubes 40. From the tubes 39 the condensed water flows into the hollow journals 37 and is conveyed therefrom by the pipes 38$^a$.

The two drums exteriorly thereof are provided with blades, as 41, fastened thereto in any desirable way and approximately of similar length therewith. These blades are set angularly with respect to the longitudinal axes of the respective drums and serve to positively move the material along the troughs 28 and toward and subsequently through a delivery-opening in the casing 5. When the material leaves such opening, it will be in a thoroughly-dried condition, and it can be disposed of as desired.

The blades raise the material up into the trough and feed it therealong. They traverse or are substantially in contact with the inner surface of the trough, so as to prevent the material sticking thereto. As the material falls through the skeleton drum it is heated by the hot tubes and dried, the drying operation being completed when the material passes out the delivery end of the apparatus.

Non-rotatably connected with the hollow journal 37 at the head end of the machine is a worm-gear 42, meshing with the worm 43 on a sleeve suitably fastened to a shaft, as 44, rotatably mounted upon the frame member 2, said shaft being driven in any desirable way—for example, by a pulley or band wheel. Upon the rotation of the worm-shaft 44 the two drums hereinbefore described will be rotated through the intervention of the interposed gearing.

To the head ends of the two shafts 20 are shown as fastened bevel-gears, as 45, meshing with bevel-pinions, as 46, upon the shaft 47, the latter being operated in any suitable way—for example, by a pulley or band wheel. The shaft 47 is shown as geared, as at 48, to the shaft of the screw conveyer 17, whereby the latter may be driven by gearing, (denoted in a general way by 48.)

Having thus described the invention, what I claim is—

1. A drying apparatus involving a casing, two troughs in the casing, arranged side by side, a deflector between the head ends of the troughs, means for delivering material onto the deflector, the latter serving to divide the material into two portions and to direct such portions into the respective troughs, stirring devices in the troughs adapted also to feed the material therealong, said troughs having outlets, a trough into which the material falls from said outlets, and means for heating the material while in the last-mentioned trough and for feeding it therealong.

2. A drying apparatus involving a casing provided with a roof having upwardly-extending flues, two troughs in the casing, arranged side by side, a deflector between the head ends of the troughs, means for delivering material onto the deflector, the latter serving to divide the material into two portions and to direct such portions into the respective troughs, stirring devices in the troughs adapted also to feed the material therealong, a trough into which the material falls from the first-mentioned trough, and means for heating the material while in the last-mentioned trough and for feeding it therealong.

3. A drying apparatus involving a casing, two troughs in the casing arranged side by side and each consisting of similar separably-connected sections, means for delivering material to the troughs, means in the troughs adapted to feed the material therealong, a trough below and adapted to receive the material from the other troughs, and means for heating the material while in the last-mentioned trough and for feeding the same therealong.

4. A drying apparatus involving a casing, two troughs in the casing, arranged side by side, a deflector between the head ends of the troughs, means for delivering material onto the deflector, the latter serving to divide the material into two portions and to direct such portions into the respective troughs, stirring devices in the troughs adapted also to feed the material therealong, said troughs having outlets, and a drum to receive the material from the troughs, said drum being provided with steam-spaces at its opposite ends, tubes connecting the ends of the drum for the passage of steam from one space to the other, said drum being rotative and having means for feeding material, and a trough in which the said drum rotates.

5. A drying apparatus involving a casing, two troughs in the casing, arranged side by side, a deflector between the head ends of the troughs, means for delivering material onto the deflector, the latter serving to divide the material into two portions and to direct such portions into the respective troughs, stirring devices in the troughs adapted also to feed the material therealong, said troughs having outlets, and a drum to receive the material from the troughs, said drum being provided with steam-spaces at its opposite ends, tubes connecting the ends of the drum for the passage of steam from one space to the other, said drum being rotative and having means for feeding material, a trough in which the said drum rotates, and a screw conveyer and its casing, the latter communicating with said deflector and having a perforated bottom.

6. A drying apparatus involving a casing, two troughs in the casing, arranged side by side, a deflector between the head ends of the troughs, means for delivering material onto the deflector, the latter serving to divide the material into two portions and to direct such portions into the respective troughs, stirring devices in the troughs adapted also to feed the material therealong, said troughs having outlets, and a drum to receive the material from the troughs, said drum being provided with steam-spaces at its opposite ends, tubes connecting the ends of the drum for the passage of steam from one space to the other, said drum being rotative and having means for feeding material, a trough in which the said drum rotates, a screw conveyer and its casing, the latter communicating with said deflector and having a perforated bottom, and a drip-pan located under said perforated bottom.

In testimony whereof I have hereunto set my hand in presence of two subscribing witnesses.

WILHELM GRIESSER.

Witnesses:
R. B. PETTY, Jr.,
E. A. MORROW.